US008538447B2

(12) United States Patent
Lundström et al.

(10) Patent No.: US 8,538,447 B2
(45) Date of Patent: Sep. 17, 2013

(54) HANDLING RESOURCES IN A COMMUNICATIONS NETWORK

(75) Inventors: Johan Edvin Gunnar Lundström, Pargas (FI); Kari-Pekka Perttula, Espoo (FI); Jussi Mäki, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 570 days.

(21) Appl. No.: 12/810,397

(22) PCT Filed: Oct. 1, 2008

(86) PCT No.: PCT/EP2008/063182
§ 371 (c)(1),
(2), (4) Date: Jun. 24, 2010

(87) PCT Pub. No.: WO2009/047192
PCT Pub. Date: Apr. 16, 2009

(65) Prior Publication Data
US 2010/0278154 A1 Nov. 4, 2010

(30) Foreign Application Priority Data

Oct. 10, 2007 (GB) .................................. 0719761.9

(51) Int. Cl.
*H04W 72/00* (2009.01)
*H04W 40/00* (2009.01)
*H04L 12/28* (2006.01)

(52) U.S. Cl.
USPC ......... 455/452.1; 455/445; 455/453; 370/401

(58) Field of Classification Search
None
See application file for complete search history.

(56) References Cited

U.S. PATENT DOCUMENTS

| 7,190,781 | B2 | 3/2007 | Beltran et al. | |
|---|---|---|---|---|
| 2002/0187790 | A1* | 12/2002 | Papadimitriou et al. | ....... 455/452 |
| 2003/0231623 | A1* | 12/2003 | Ryu et al. | ....... 370/352 |
| 2004/0203569 | A1* | 10/2004 | Jijina et al. | ....... 455/404.1 |
| 2005/0085181 | A1* | 4/2005 | Tao | ....... 455/1 |
| 2005/0213740 | A1* | 9/2005 | Williams et al. | ....... 379/211.02 |
| 2006/0223531 | A1* | 10/2006 | Hanson | ....... 455/435.1 |
| 2008/0219183 | A1* | 9/2008 | Yin | ....... 370/254 |
| 2009/0193071 | A1* | 7/2009 | Qiu et al. | ....... 709/203 |
| 2009/0319685 | A1* | 12/2009 | Martin | ....... 709/240 |

FOREIGN PATENT DOCUMENTS

| CA | 1 072 227 A1 | 2/1980 |
|---|---|---|
| WO | WO 03/050707 A | 6/2003 |

* cited by examiner

*Primary Examiner* — Faruk Hamza
*Assistant Examiner* — Andrew Oh

(57) ABSTRACT

A method and apparatus for managing Time Division Multiplex resources for a pool of Mobile Switching Center Servers in a communications network. Time Division Multiplex resources are provided at a Media Gateway function serving the pool of Mobile Switching Center Servers. Virtual Time Division Multiplex resources are allocated to each Mobile Switching Center Server in the pool and mapped to the Time Division Multiplex resources. An ISUP signalling proxy function may be provided at the Media Gateway function. TDM resources are allocated to at least one Mobile Switching Center, and associated with an identifier of the Mobile Switching Center Server. The TDM resources are mapped to the Time Division Multiplex resource identifier. When the media Gateway receives an ISUP message, it replaces the identifier with an ISDN User Part signalling proxy function identifier before sending the message to a node in an external network.

12 Claims, 18 Drawing Sheets

HANDLING RESOURCES IN A COMMUNICATIONS NETWORK

TECHNICAL FIELD

The invention relates to the field of handling resources in a communications network, and in particular to handling Time Division Multiplex resources in a communications network.

BACKGROUND

In a Mobile Softswitch-based Core Network, each Time Division Multiplex (TDM) resource (e.g. an E1) in a Media Gateway is statically allocated to one Mobile Switching Centre (MSC) Server. MSCs can be pooled in order to improve the resilience of a network in the event of failure of one MSC. In an MSC pool, the result of this is that TDM resources per MSC Server must be over-allocated to deal with situations when an MSC Server in the pool is out-of-service (e.g. owing to maintenance or faults), and other MSC Servers in the pool are required to handle the traffic normally handled by the out-of-service MSC Server. This over-allocation results in a high capital and operating expenditure for network operators. The TDM resources in question are used both on the A-interface and the Point-of-Interconnect (POI) towards other networks. Another problem in an MSC Pool is the handling of the POI interface from a signalling point of view. In order to keep the number of MSC Servers visible on the POI as low as possible, a normal recommendation is to dedicate two MSC Servers to act as gateways. The result of this is that normally two MSC Servers (i.e, the originating and the gateway) are involved in an originating call. The over-allocation of TDM resources is 50% on the POI in this configuration.

The problem of over-allocation of TDM resources is illustrated in FIG. 1. Each MSC-S 101, 102, 103 owns dedicated Circuit Identification Codes (CICs) 104, 105, 106, and if one MSC-S 101 fails than the other MSC-Ss 102, 103 must handle traffic. In normal operation, 50% of the CICs are never used, and all MSC-S nodes are visible to other networks.

Referring to FIG. 2 herein, a problem of MSC-S (numbered as 1-4) SS7 point codes being visible in external networks is illustrated. This complicates or hinders MSC Pool expansions with new MSC Servers and in some cases costs extra money for the operators as public SS7 Point Codes are needed.

Referring to FIG. 3, when an MSC-S (e.g. MSC-S 1) become unavailable for some reason, such as failure or maintenance, the TDM Resources assigned to the unavailable MSC-S 1 remain unavailable as described above. In a layered architecture, the physical TDM Resources are terminated by the Media Gateways 5, but they are controlled by the dedicated MSC-Ss. Thus the actual TDM Resources are not lost and the transmission capacity could be still used. This lowers the capacity of the network until the owner of the TDM resources recovers.

Referring to FIG. 4, when the MSC Pool 6 is directly connected to the Point of interface (POI), dimensioning the required TDM resources is difficult, because subscriber behaviour might not exactly the same in each MSC Pool Member 1-4. Therefore additional TDM resources must be reserved towards the POI interface to avoid networks congestion. In the example of FIG. 4, MSC-S 1 has congestion even though 15% of E1s are free.

SUMMARY

There is a need to improve the efficiency of allocation of TDM resources in a MSC pool, and to hide the topology of an MSC pool in order to allow changes to the MSC pool without requiring further changes to nodes in external networks.

According to a first aspect of the invention, there is provided a method of managing Time Division Multiplex resources for a pool of Mobile Switching Centre Servers in a communications network. The method comprises, at a Media Gateway function serving the pool of Mobile Switching Centre Servers, providing Time Division Multiplex resources. Virtual Time Division Multiplex resources are dynamically allocated to each Mobile Switching Centre Server in the pool and mapped to the Time Division Multiplex resources. In this way, Time Division Multiplex resources are only provided to a Mobile Switching Centre when needed, and need not be reserved for a particular Mobile Switching Centre.

Optionally, the method further comprises receiving at the Media Gateway function an Initial Address Message from a node in an external network and selecting a Mobile Switching Centre Server from the pool to handle a communication associated with the Initial Address Message. Virtual Time Division Multiplex resources are allocated to the selected Mobile Switching Centre Server. The Initial Address Message is amended to include a flag identifying the allocated virtual Time Division Multiplex resources, and sent to the selected Mobile Switching Centre Server.

The method optionally comprises receiving at the Media Gateway function an Initial Address Message from a Mobile Switching Centre Server in the pool of Mobile Switching Centre Servers, the Initial Address message including an identity of virtual Time Division Multiplex resources. Time Division Multiplex resources allocated are determined from the virtual Time Division Multiplex resources identified in the message. The Initial Address Message is amended to include a flag identifying the allocated Time Division Multiplex resources, and sent to a node in an external network.

According to a second aspect of the invention, there is provided a Media Gateway for use in a communications network. The Media Gateway comprises means for providing Time Division Multiplex resources, means for allocating virtual Time Division Multiplex resources to a Mobile Switching Centre Server in a pool of Mobile Switching Centre Servers, and means for mapping the virtual Time Division Multiplex resources to the Time Division Multiplex resources.

The Media Gateway optionally comprising a receiver for receiving an Initial Address Message from a node in an external network, means for selecting a Mobile Switching Centre Server from the pool to handle a communication associated with the Initial Address Message, means for allocating virtual Time Division Multiplex resources to the selected Mobile Switching Centre Server, means for amending the Initial Address Message to include a flag identifying the allocated virtual Time Division Multiplex resources, and a transmitter for sending the amended Initial Address Message to the selected Mobile Switching Centre Server.

Optionally, the Media Gateway further comprises a receiver for receiving an Initial Address Message sent from a Mobile Switching Centre Server in the pool of Mobile Switching Centre Servers, the Initial Address message including an identity of virtual Time Division Multiplex resources, means for determining from the virtual Time Division Multiplex resources identified in the message the Time Division Multiplex resources allocated, means for amending the Initial Address Message to include a flag identifying the allocated Time Division Multiplex resources, and a transmitter for sending the amended Initial Address Message to a node in an external network.

According to a third aspect of the invention, there is provided a method of managing Time Division Multiplex resources for a pool of Mobile Switching Centre Servers in a communications network. The method comprises providing an ISDN User Part signalling proxy function located at a Media Gateway, the Media Gateway serving at least one Mobile Switching Centre Server. A Time Division Multiplex resource at the Media Gateway is allocated to the at least one Mobile Switching Centre, the Time Division Multiplex Resource being associated with an identifier of the at least one Mobile Switching Centre Server, and mapping the Time Division Multiplex resource to the identifier. When the Media Gateway receives an ISDN User Part signalling message at the from the at least one Mobile Switching Centre Server, it replaces the Mobile Switching Centre Server identifier with an ISDN User Part signalling proxy function identifier, and sends the message to a node in an external network. In this way, the pool of Mobile Switching centres can be increased or altered without needing to inform external networks of any changes.

The method optionally comprises receiving an ISDN User Part signalling message at the Media Gateway from the node in an external network, the message comprising a Time Division Multiplex resource, and determining from the Time Division Multiplex resource the identifier of a Mobile Switching Centre Server. The message is then forwarded to the identified Mobile Switching Centre Server.

Optionally, the at least one Mobile Switching Centre Server is one of a plurality of Mobile Switching Centre Servers in a Mobile Switching Centre Server pool, as this is a more common situation.

The method optionally further comprises allocating Time Division Multiplex resources to each Mobile Switching Centre Server in the Mobile Switching Centre Server pool, and re-allocating Time Division Multiplex resources in the event that a Mobile Switching Centre Server is no longer available.

Optionally, the method comprises dynamically re-allocating Time Division Multiplex resources to each Mobile Switching Centre Server in the Mobile Switching Centre Server pool to minimize resource congestion for an individual Mobile Switching Centre.

Time Division Multiplex resources at the Media Gateway are optionally reserved for a Mobile Switching Centre Server such that they cannot be dynamically allocated to another Mobile Switching Centre Server. This ensures that a mobile Switching Centre always has a minimum amount of resources available.

According to a fourth aspect of the invention, there is provided a Media Gateway for use in a communications network. The Media Gateway comprises an ISDN User Part signalling proxy function and means for allocating a Time Division Multiplex resource at the Media Gateway to at least one Mobile Switching Centre served by the Media Gateway, the Time Division Multiplex Resource being associated with an identifier of the at least one Mobile Switching Centre Server. There is also provided means for mapping the Time Division Multiplex resource to the identifier, a receiver for receiving an ISDN User Part signalling message at the Media Gateway from the at least one Mobile Switching Centre Server, means for replacing the Mobile Switching Centre Server identifier with an ISDN User Part signalling proxy function identifier, and a transmitter for sending the message to a node in an external network.

The Media Gateway optionally comprises means for allocating Time Division Multiplex resources to each Mobile Switching Centre Server in a Mobile Switching Centre Server pool, and means for re-allocating Time Division Multiplex resources in the event that a Mobile Switching Centre Server is no longer available.

Optionally, the Media Gateway further comprises means for dynamically re-allocating Time Division Multiplex resources to each Mobile Switching Centre Server in a Mobile Switching Centre Server pool to minimize resource congestion for an individual Mobile Switching Centre.

DETAILED DESCRIPTION

The following description sets forth specific details, such as particular embodiments, procedures, techniques, etc. for purposes of explanation and not limitation. It will be appreciated by one skilled in the art that other embodiments may be employed apart from these specific details. For example, although the following description is facilitated using a non-limiting example application to mobile communication networks configured in a tree type network topology, this technology has application to any communications network application. In some instances, detailed descriptions of well known methods, interfaces, circuits, and devices are omitted so as not obscure the description with unnecessary detail. Moreover, individual blocks are shown in some of the figures. Those skilled in the art will appreciate that the functions of those blocks may be implemented using individual hardware circuits, using software programs and data, in conjunction with a suitably programmed digital microprocessor or general purpose computer, using application specific integrated circuitry (ASIC), and/or using one or more digital signal processors (DSPs).

Figure 5:
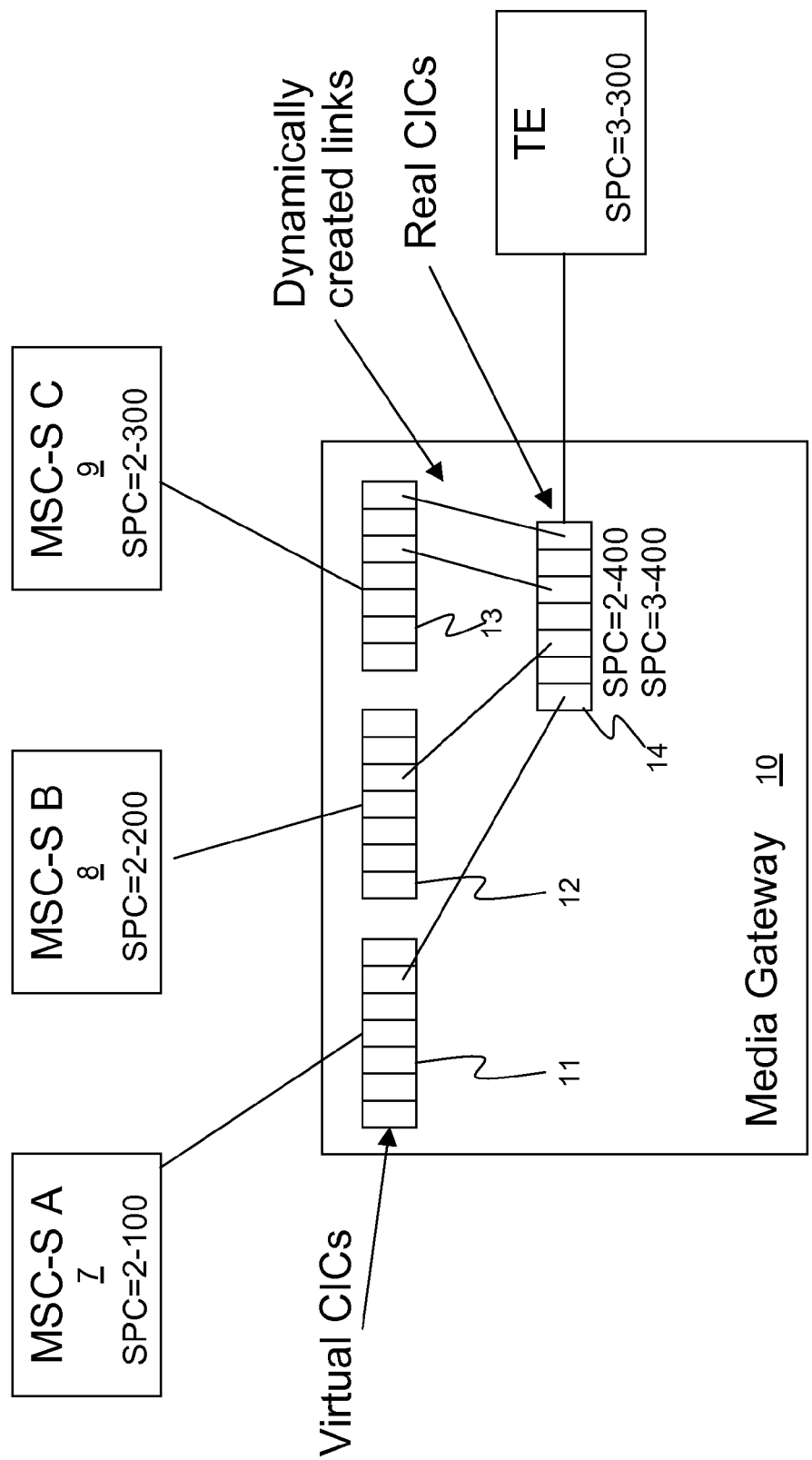
FIG. 5 illustrates schematically the principle of pooling TDM resources in a Mobile Switching Centre pool according to an embodiment of the invention.

Referring to FIG. 5, a pool of MSC-Ss 7, 8, 9 is illustrated, along with a Media Gateway (MGW) 10. TDM resources are located at the Media Gateway, and are pooled between all of the MSC-Ss 7, 8, 9. In this way, the number of TDM resources can be significantly reduced. On the POI, the reduction is typically 50% and on the A-interface 100% divided by the number of MSC Servers in the MSC Pool. Additionally, less MSC Server and Media Gateway capacity is needed as the originating call case only needs to involve one MSC Server instead of two.

TDM Pooling is achieved by introducing virtual TDM resources in the Media Gateway 10, identified by Virtual Circuit Identification Codes (VCICs) 11, 12, 13. The VCICs are dynamically linked to the real CICs 14 in a MGW 10 when a call is established and kept for the duration of the call. The number of VCICs 11, 12, 13 owned by an MSC Server covers the whole range of real CICs, and each MSC Server owns such a range of VCICs.

Figure 6:
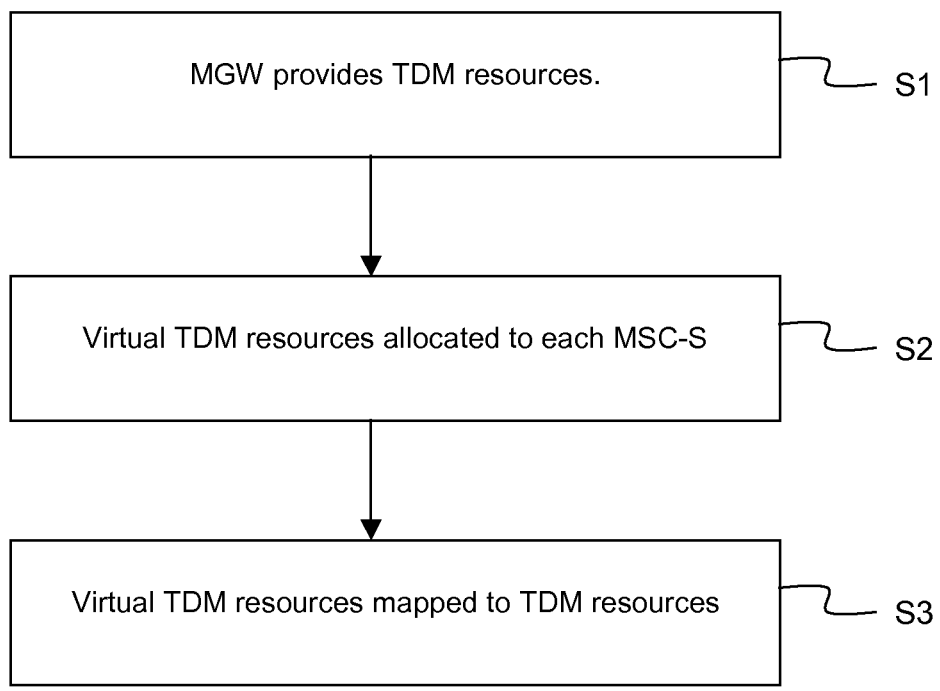
FIG. 6 is a flow diagram illustrating the steps according to an embodiment of the invention.
Figure 8:
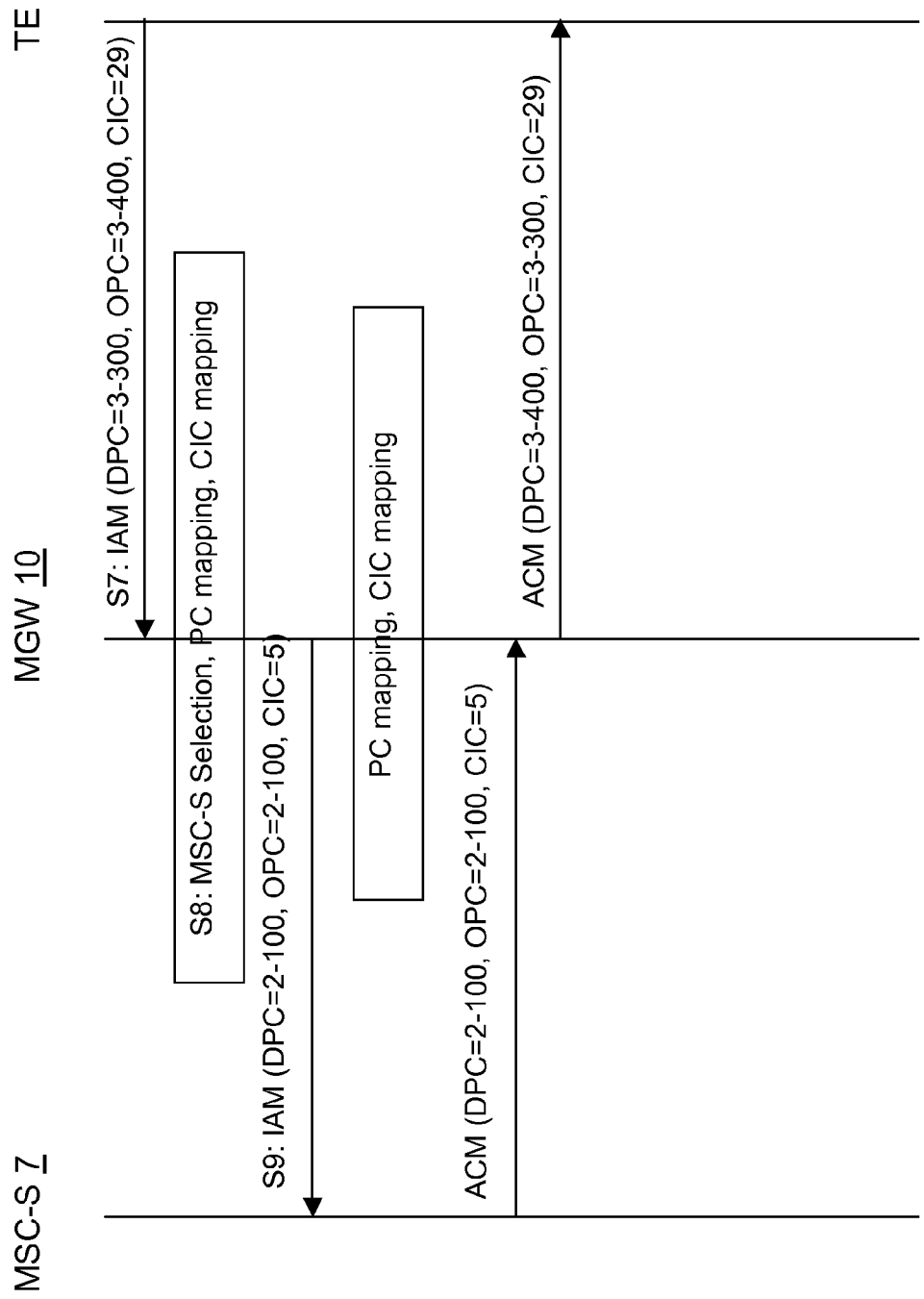
FIG. 8 illustrates the signalling between Terminal Equipment, a Media Gateway and a Mobile Switching Centre Server in the case of an outgoing call according to an embodiment of the invention.

The invention is summarized in the flow diagram shown in FIG. 6, with the following numbering referring to the numbering of FIG. 8:

S1. The MGW 10 provides TDM resources.
S2. Virtual TDM resources are allocated to each MSC-S 7, 8, 9 in the pool.
S3. The virtual TDM resources are then mapped to the TDM resources.

Figure 7:
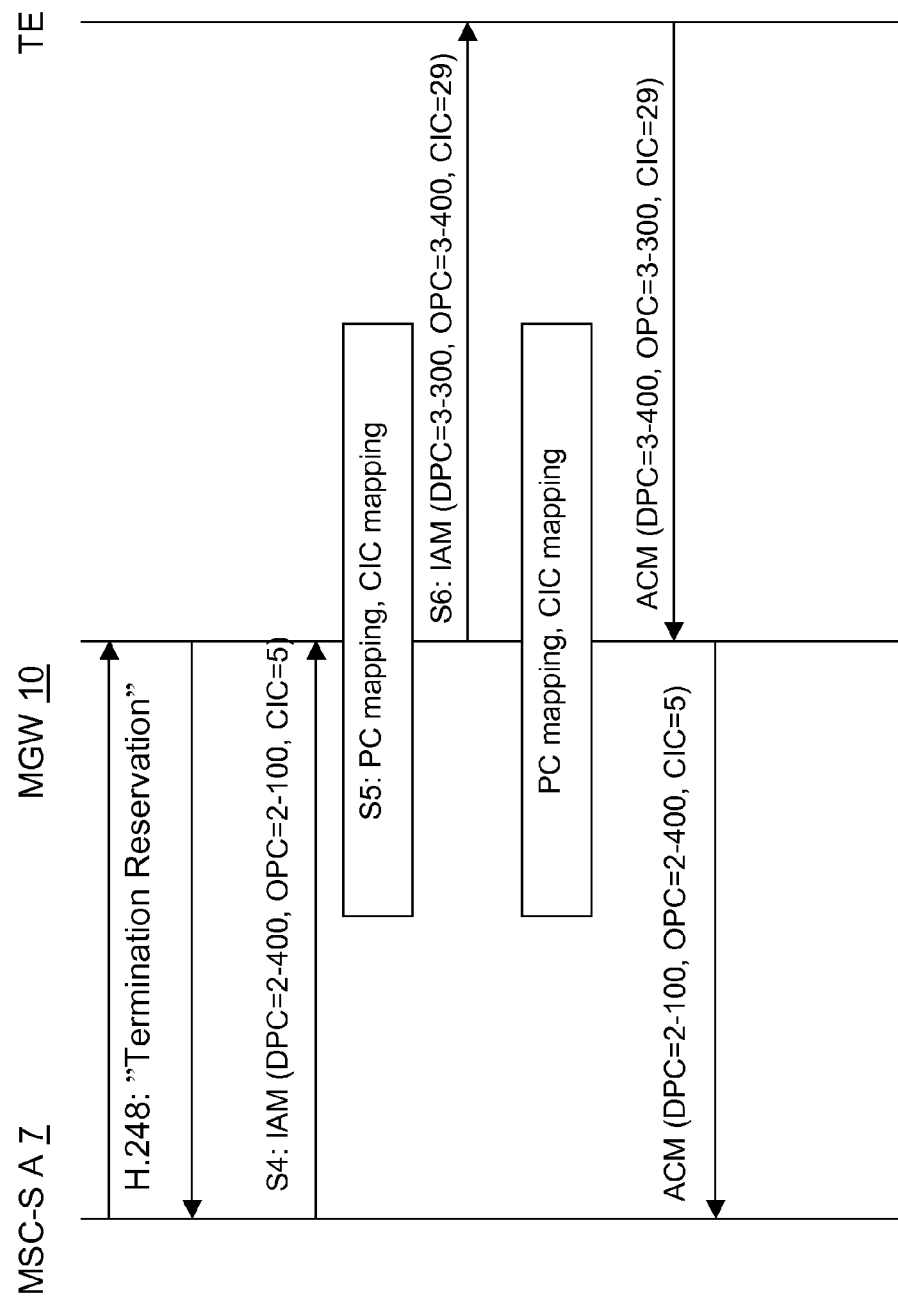
FIG. 7 illustrates the signalling between Terminal Equipment, a Media Gateway and a Mobile Switching Centre Server in the case of an incoming call according to an embodiment of the invention.

As illustrated in FIG. 7, in the case of an Initial Address Message (IAM) message being received from a MSC-S 7, a CIC 14 is selected and linked to a VCIC 11 received from the MSC-S 7. The VCIC in the IAM is replaced with the real CIC before the IAM is sent to the POI. Only the Signalling Point Code (SPC) of the Media Gateway 10 is visible towards the POI and the MSC Servers. The Media Gateway terminates/originates ISUP messages as seen from the POI or the MSC Server. On the A-interface, the VCIC is always selected by the MSC Server, and a real CIC selected by the Media Gateway and used towards the BSC.

The MGW 10 receives the IAM from MSC-S A 7. The IAM includes an identity of the virtual TDM resources. The MGW 10 then determines S5 from the virtual TDM resources identified in the IAM the TDM resources allocated, and amends the IAM to include a flag identifying the allocated Time Division Multiplex resources. The amended IAM is then sent S6 to a node 15 in an external network.

As illustrated in FIG. 8, in the case of an incoming IAM from the POI, the Media Gateway 10 uses the same type of algorithm as in an A-flex capable Base Station Controller (BSC) to select an MSC-S 7 to which the call is directed. A VCIC 11 belonging to the chosen MSC-S 7 is allocated and inserted instead of the real CIC in the IAM before it is sent to the MSC-S 7. At the same time, a link between the VCIC 11 and the real CIC 14 is established and maintained for the duration of the call.

The MGW 10 receives S7 an IAM from a node 15 in an external network. It selects S8 a MSC-S 7 from the pool to handle a communication associated with the IAM and allocates virtual TDM resources to the selected MSC-S 7. The IAM is amended to include a flag identifying the allocated virtual Time Division Multiplex resources, and sent S9 to the selected MSC-S 7.

Figure 9:
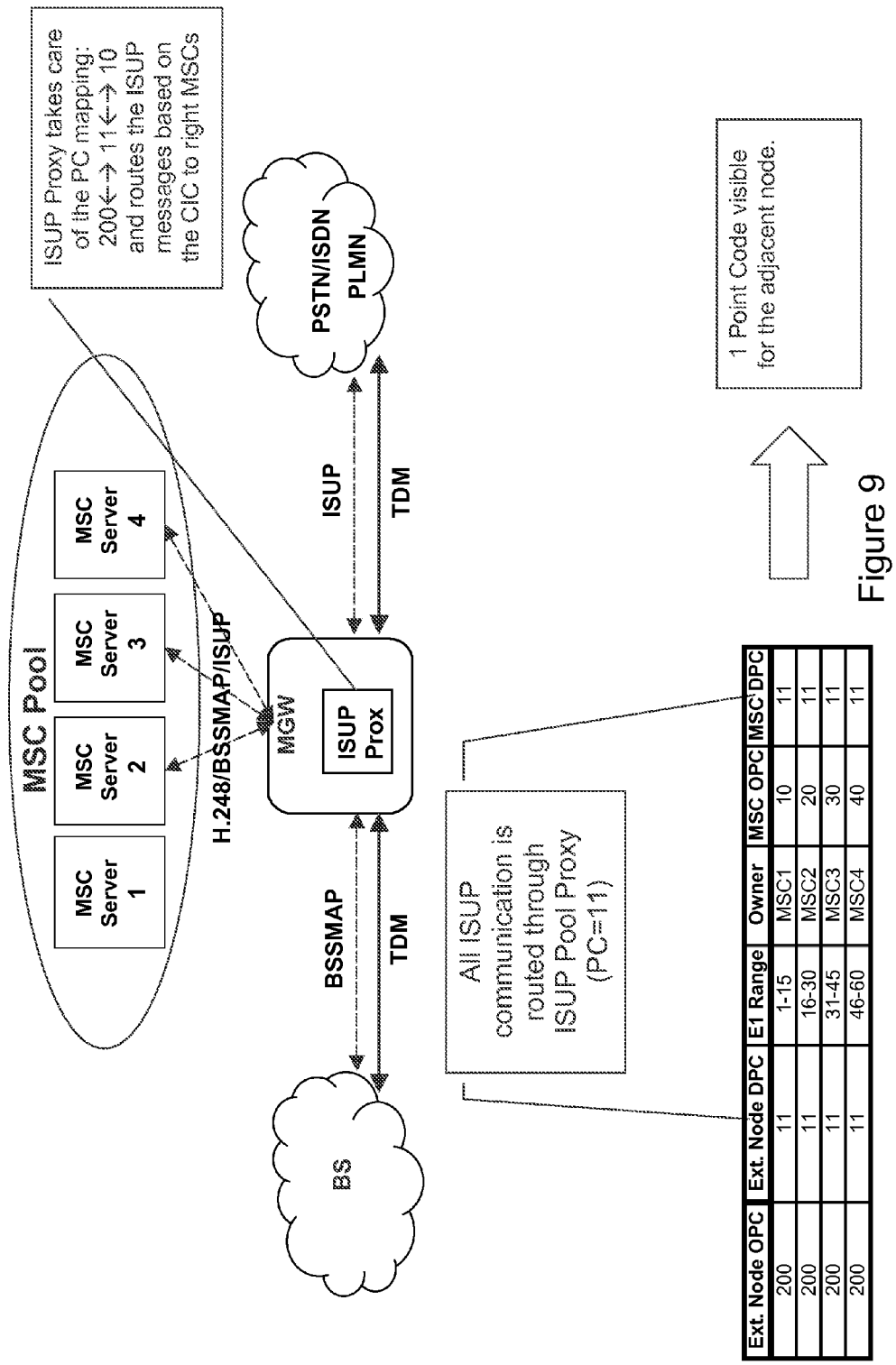
FIG. 9 illustrates schematically an ISUP Proxy function in a Media Gateway serving a Mobile Switching Centre pool according to an embodiment of the invention.

In an alternative embodiment of the invention, further ways are provided for pooling TDM resources and hiding network topology. ISDN User Part (ISUP) signalling is based on SS7 and requires that end-points of the signalling know the Point Code (PC) of the receiver. This PC is unique per network node, so each MSC in a pool has a unique PC. This poses a problem to flexible allocation of TDM resources in a scenario in which an MSC in a pool fails. Physical timeslots for TDM communications are identified in the ISUP protocol with Circuit Identification Codes (CIC) and they are always bound to a PC. As illustrated in FIG. 9, ISUP Signalling Proxy functionality is implemented in the MGW 5. All ISUP signalling is routed via the POI interface, and the MGW 5 is provided with the capability of performing PC mapping and routing of the ISUP messages based on the CIC values to the correct MSC. In external networks only the PC of the ISUP Signaling Proxy and MSCs in the Core Network would identify the external node based on that same PC. In this way the MSC Servers inside the Core network are not directly visible to the external networks, so they can be added or removed without any impact on the external networks.

Figure 10:
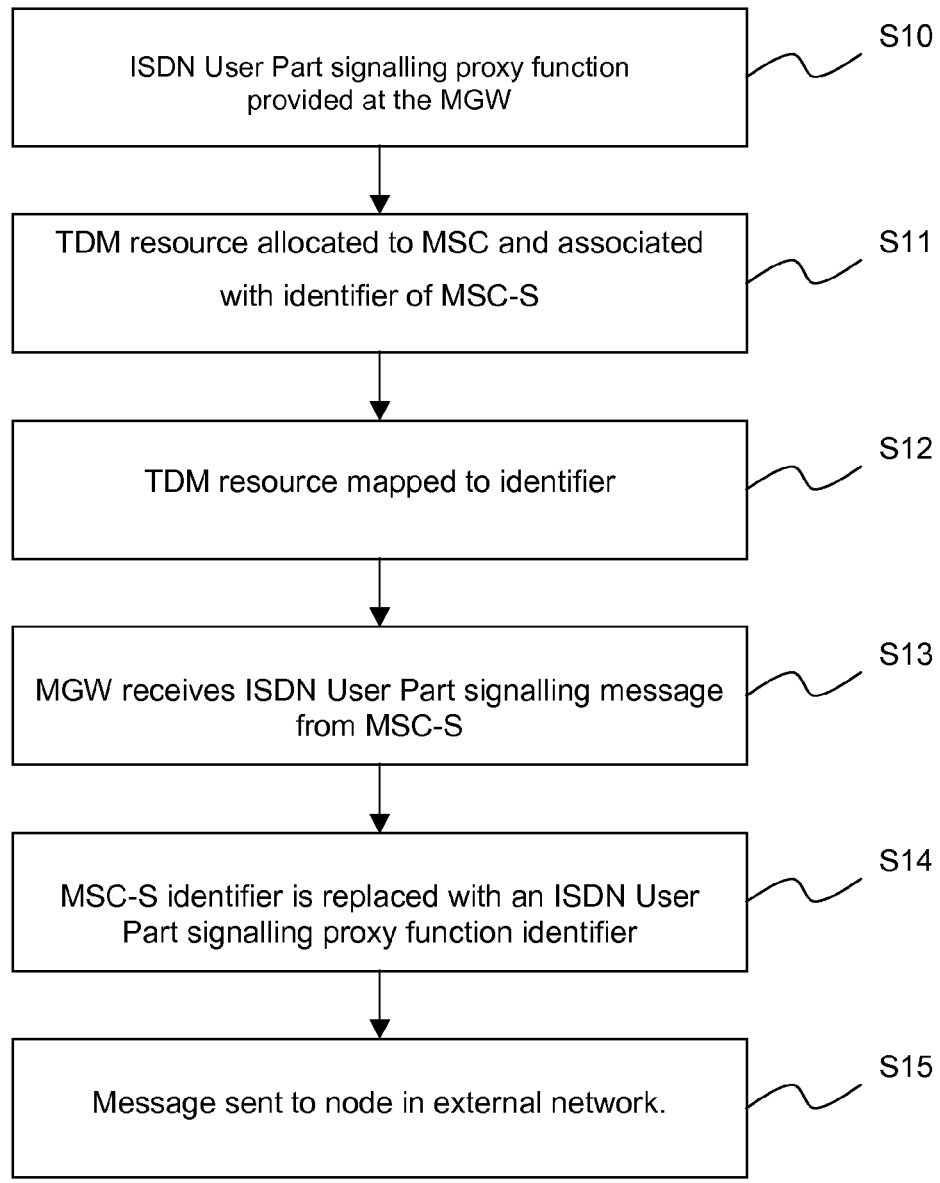
FIG. 10 is a flow diagram illustrating a method of managing TDM resources for a pool of MSCs according to an embodiment of the invention.

This embodiment of the invention is illustrated in FIG. 10, with the following numbering corresponding to the numbering in FIG. 10:

S10. An ISDN User Part signalling proxy function is provided located at the MGW 5;
S11. The MGW 5 allocates TDM resource to at least one MSC. The TDM resource is associated with an identifier of the at least one MSC-S 1;
S12. The MGW 5 maps the TDM resource to the identifier;
S13. The MGW 5 receives an ISDN User Part signalling message from the MSC-S 1,
S14. The MSC-S 1 identifier is replaced with an ISDN User Part signalling proxy function identifier;
S15. The message is then sent to a node in an external network.

Figure 11:
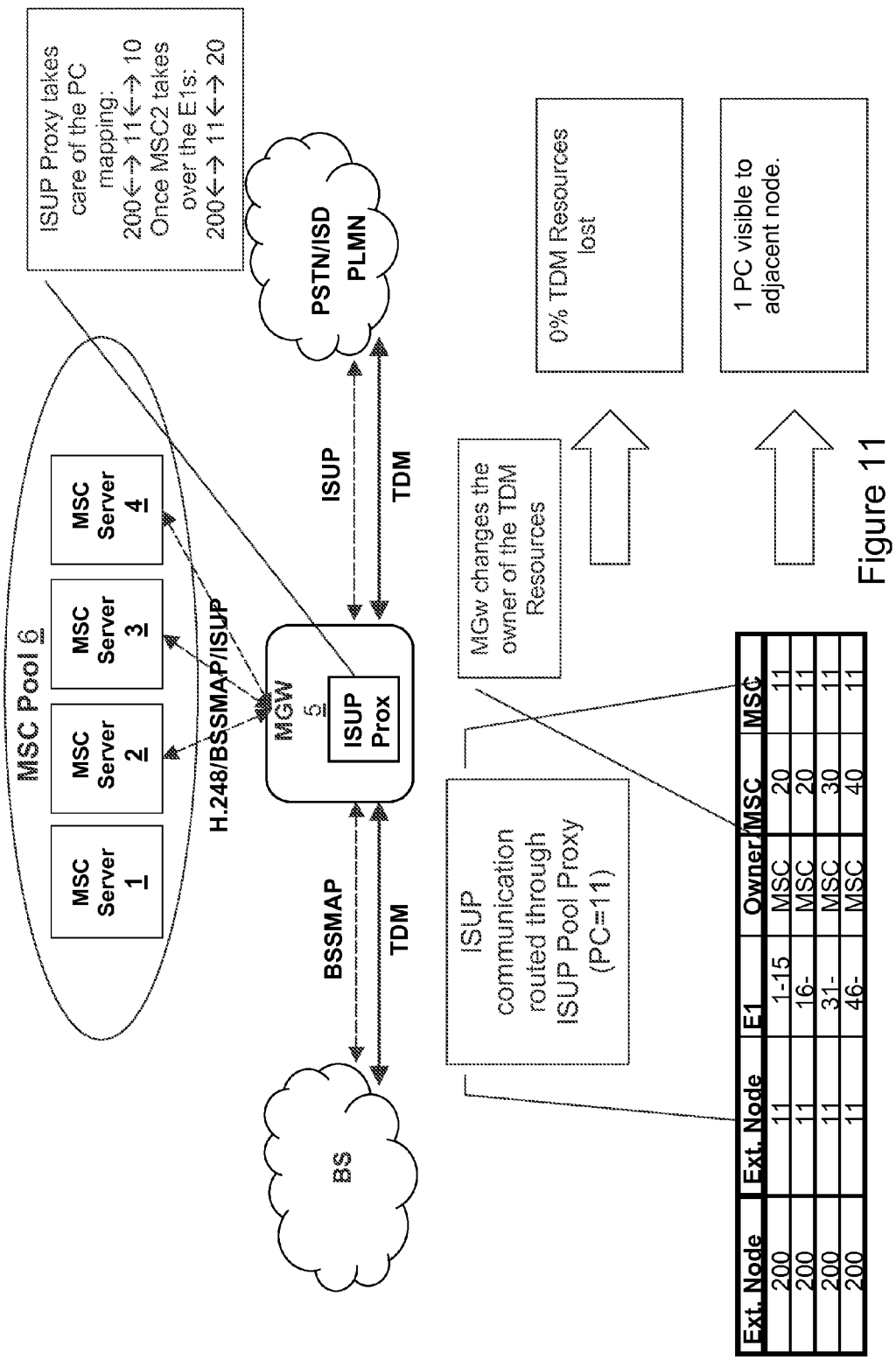
FIG. 11 illustrates schematically the pooling of TDM resources in a Mobile Switching Centre pool according to an embodiment of the invention.
Figure 12:
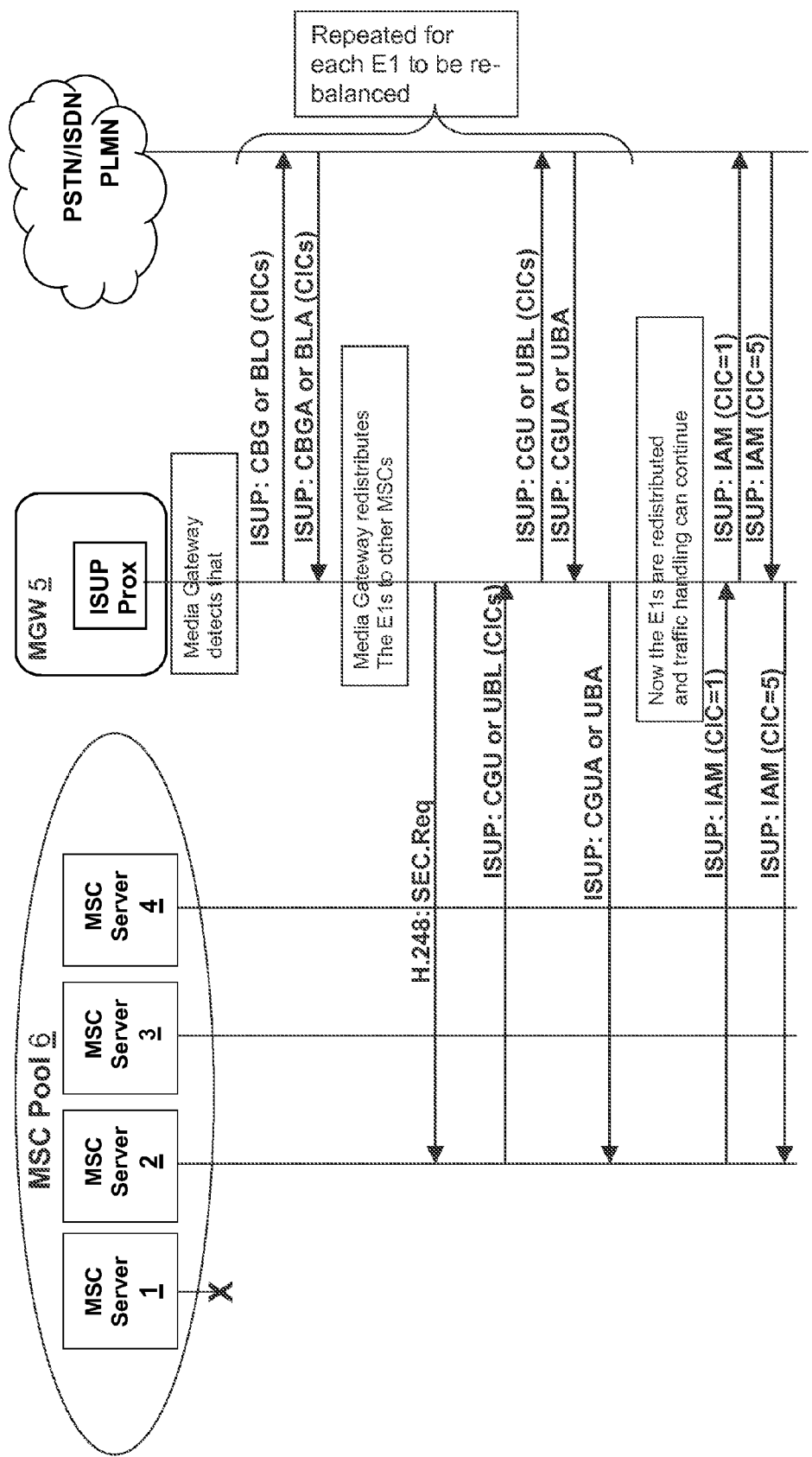
FIG. 12 illustrates the signalling when a Mobile Switching Centre in a pool restarts according to an embodiment of the invention.
Figure 13:
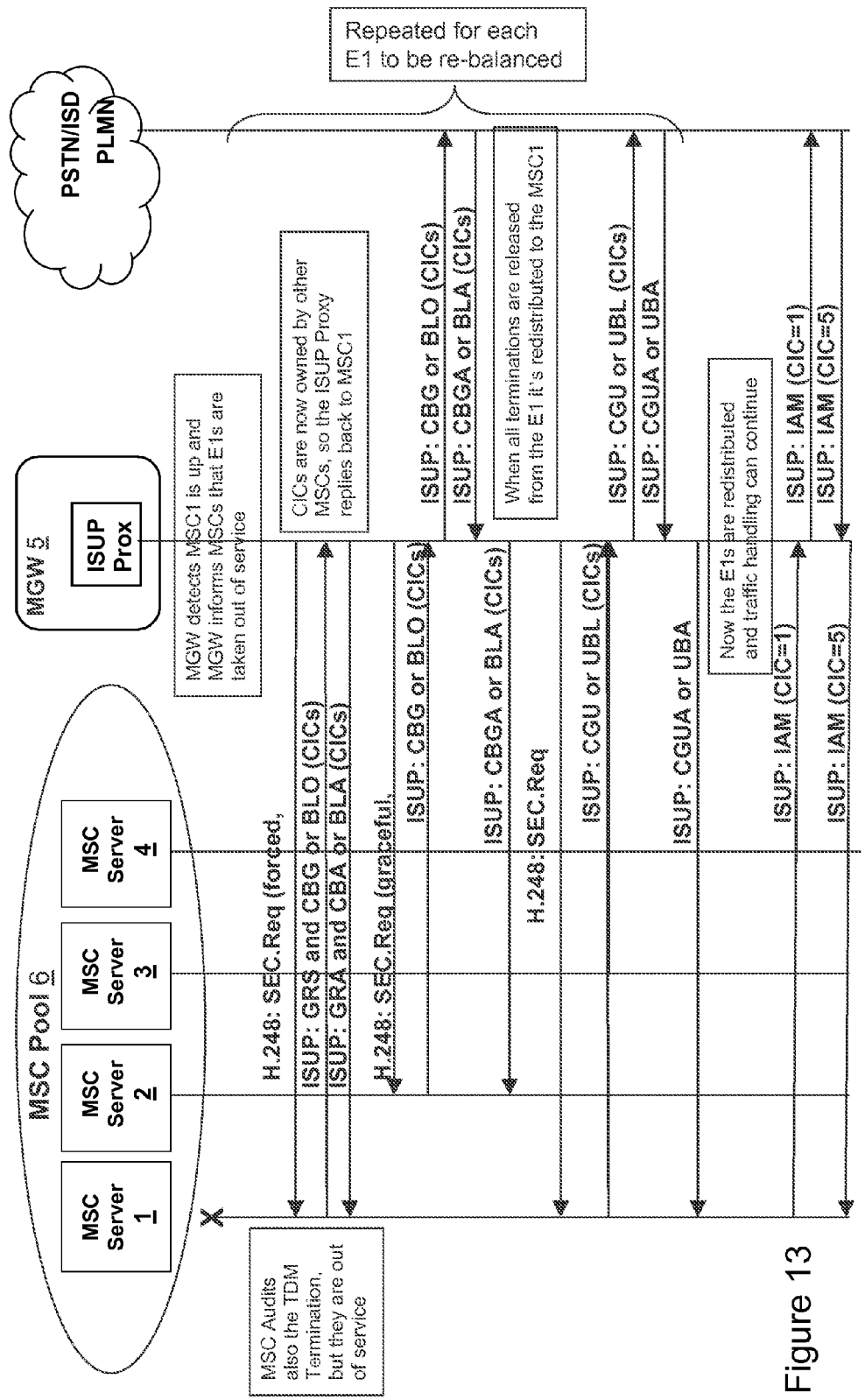
FIG. 13 illustrates the signalling when a Mobile Switching Centre in a pool recovers according to an embodiment of the invention.

In order to free TDM resources that would otherwise be unavailable owing to the unavailability of a MSC, ownership of TDM resources is changed, as illustrated in FIG. 11. This change of the ownership is controlled by the MGW 5, at which the physical TDM resources are located. In the even that MSC1 in the MSC pool fails, the MGW 5 detects that MSC1 is down. MGW 5 uses standard H.248 methods to inform the other working MSC (MSC2), that the TDM resources are functional. This MSC (MSC2) can start to use those resources for normal call handling. Once MSC1 recovers, MGW 5 informs MSC2 that the TDM resources are unavailable. MGW 5 informs MSC2 that the usage of TDM resources should be stopped. MSC2 handles ongoing calls until they finish, and routes any the new calls to other TDM resources. When the calls in the TDM resources are disconnected, MGW 5 informs MSC1 that the TDM resources are once more available. In this way, the network can go back to the initial starting position of allocation of TDM resources, and usage of the networks resources remained high through out the MSC outage. This requires that the TDM resources are configured identically to the MSCs and MGW 5 contains functionality to controls the distribution of the TDM resource control to MSCs. This logic is built in to the MGW 5 with help of standard H.248 procedures and doesn't require any new developments in the MSC. A network management system can be developed to help the configuration, fault and performance management of the pooled TDM resources. The signalling for MSC1 at restart and recovery is illustrated in FIGS. 12 and 13 respectively.

Figure 1:
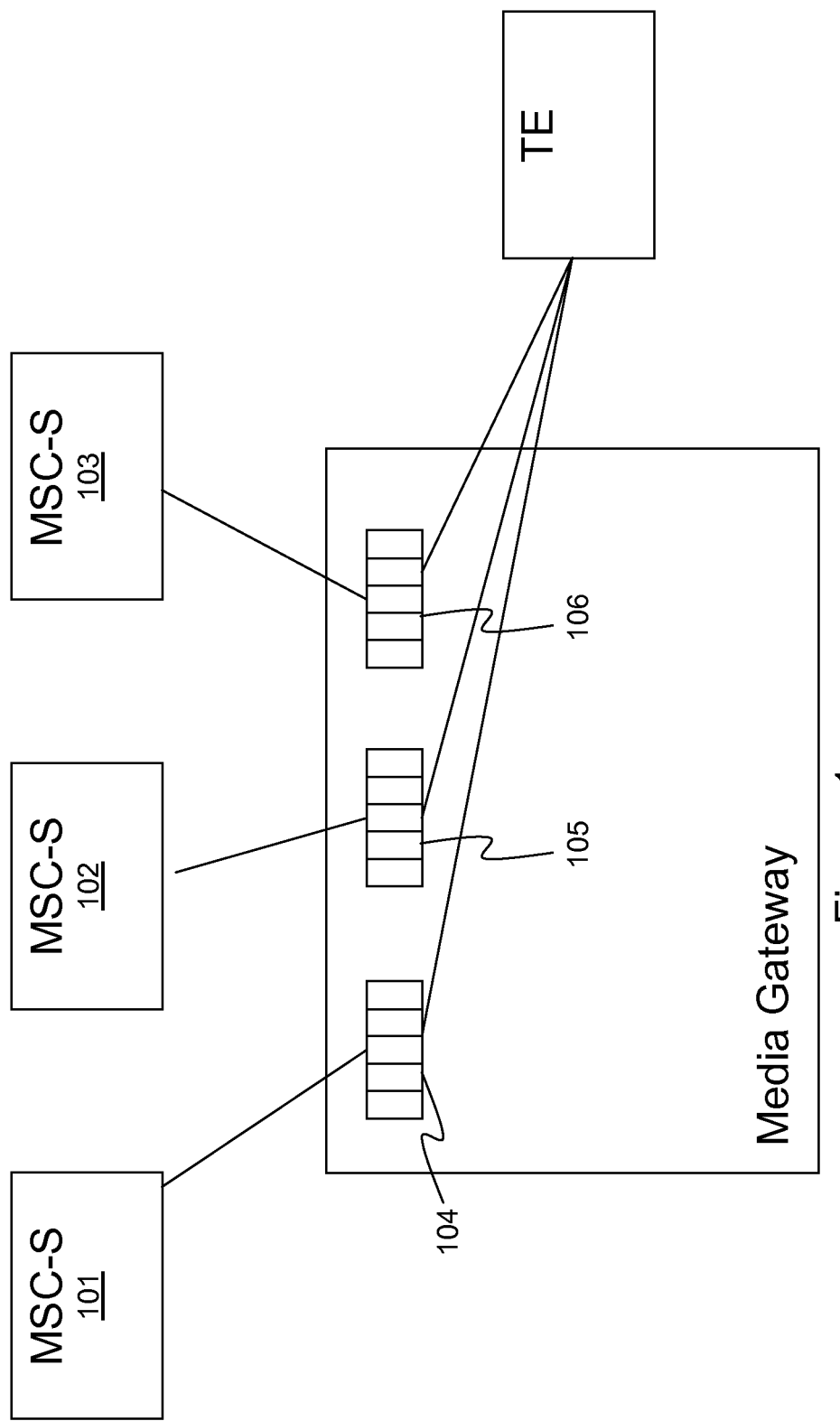
FIG. 1 illustrates schematically a problem with static allocation of TDM resources in a pool of Mobile Switching Centres.
Figure 2:
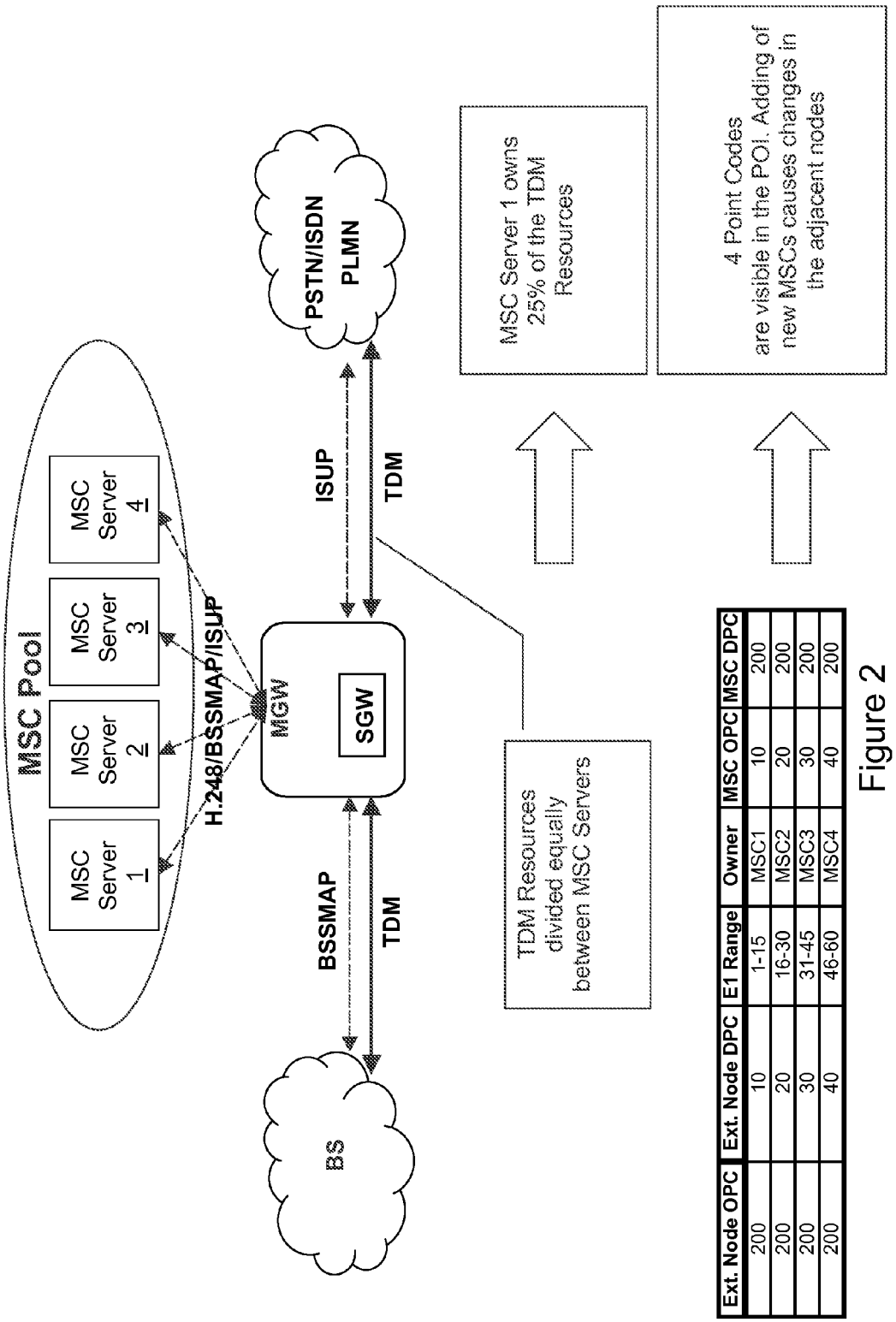
FIG. 2 illustrates schematically the problem of MSC-S codes being visible in external networks.
Figure 3:
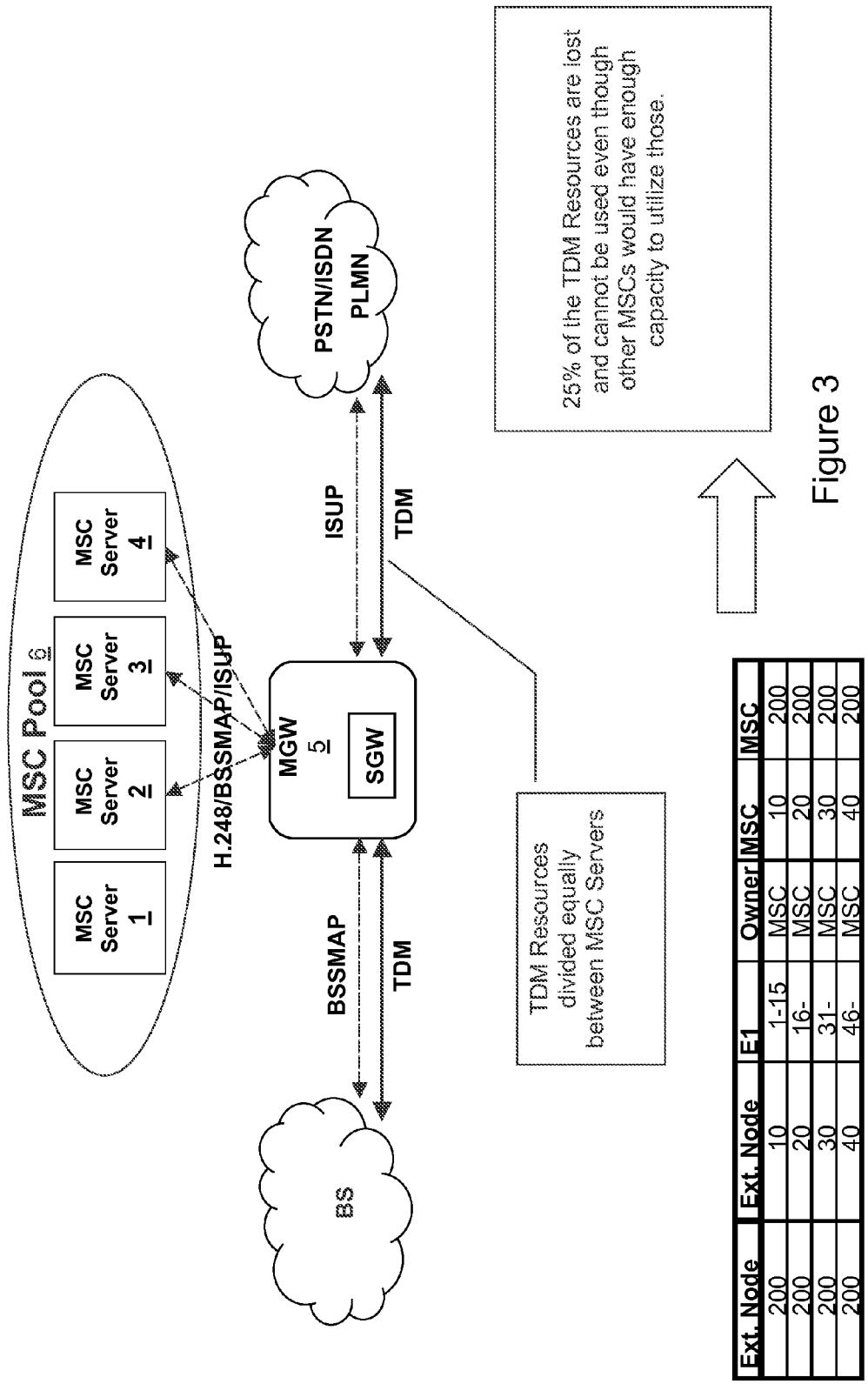
FIG. 3 illustrates schematically the problem of static allocation of TDM resources in a pool of Mobile Switching Centres.
Figure 4:
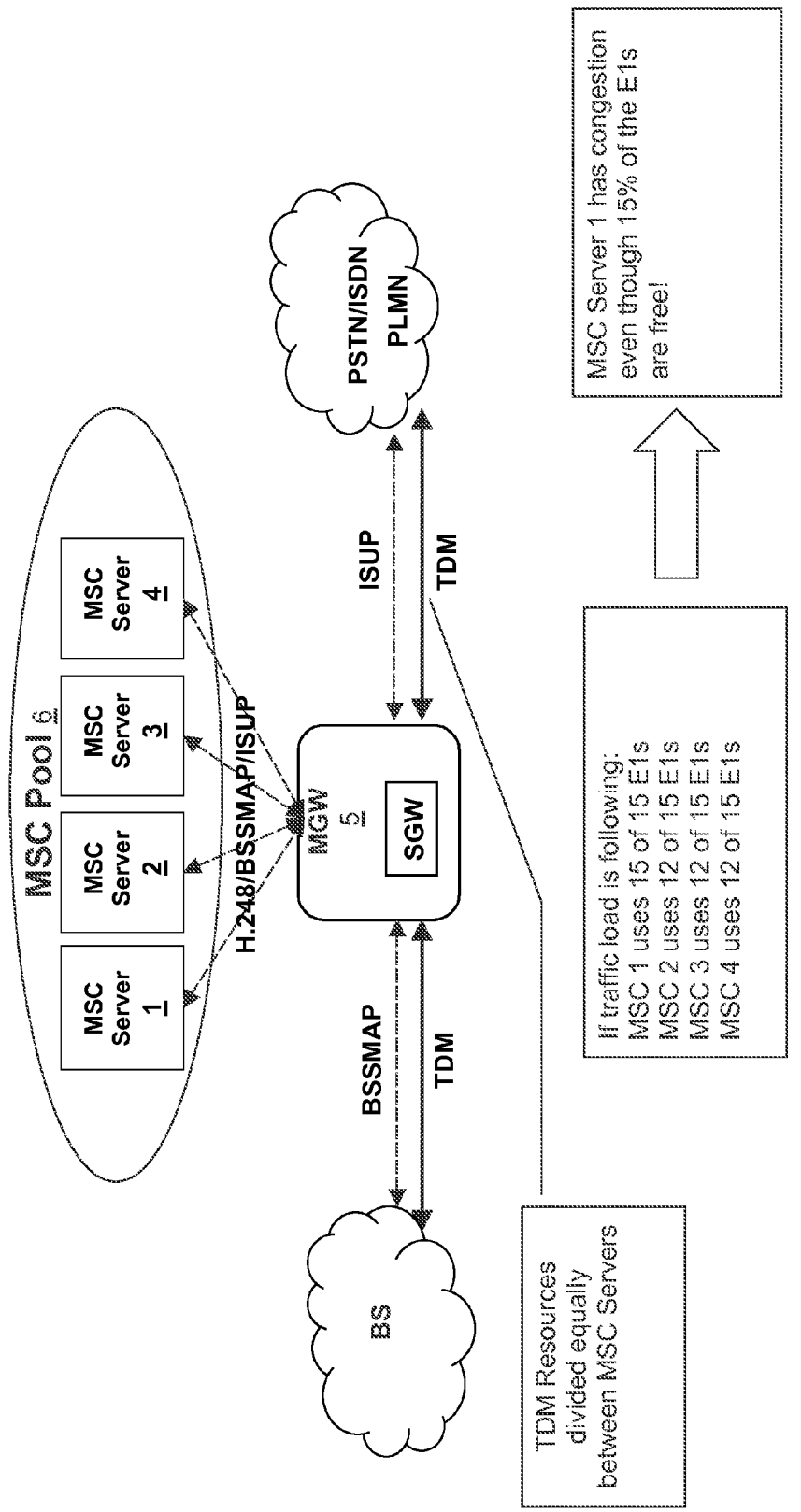
FIG. 4 illustrates schematically the problem of congestion of TDM resources for a Mobile Switching Centre Server even where resources are free.
Figure 14:
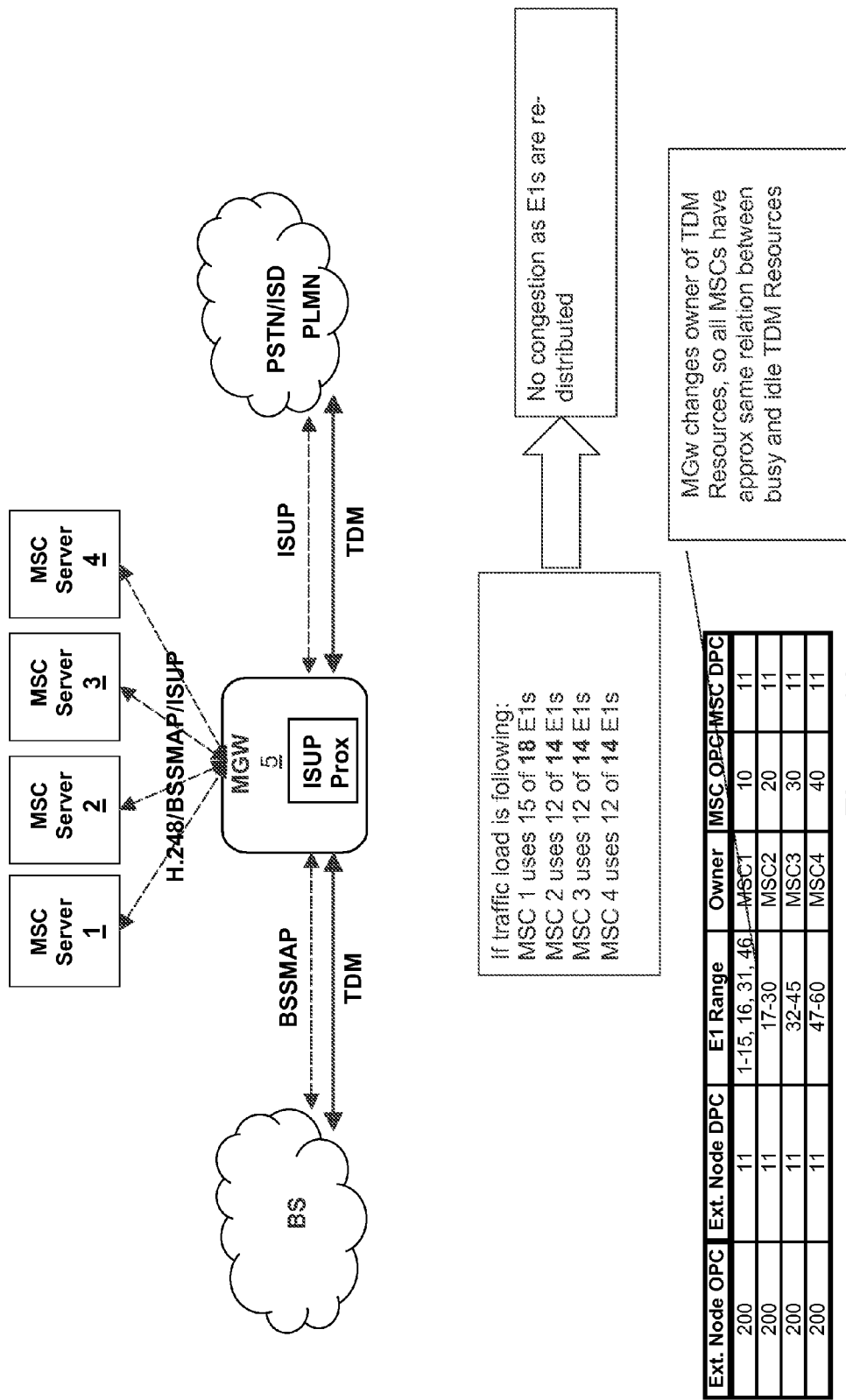
FIG. 14 illustrates schematically the pooling of TDM resources in a Mobile Switching Centre pool according to an embodiment of the invention.
Figure 15:
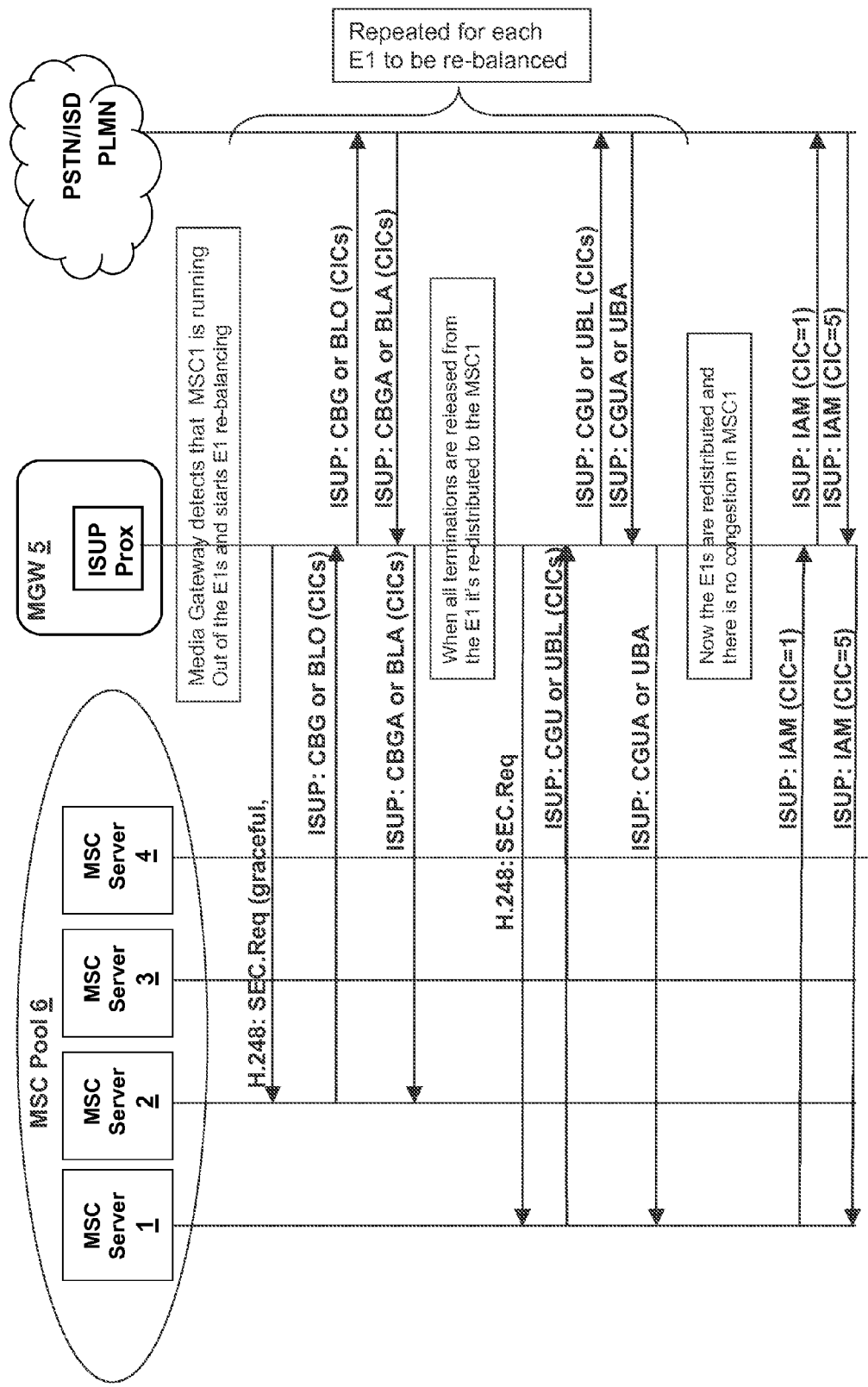
FIG. 15 illustrates the signalling when TDM resources are rebalanced according to an embodiment of the invention.
Figure 16:
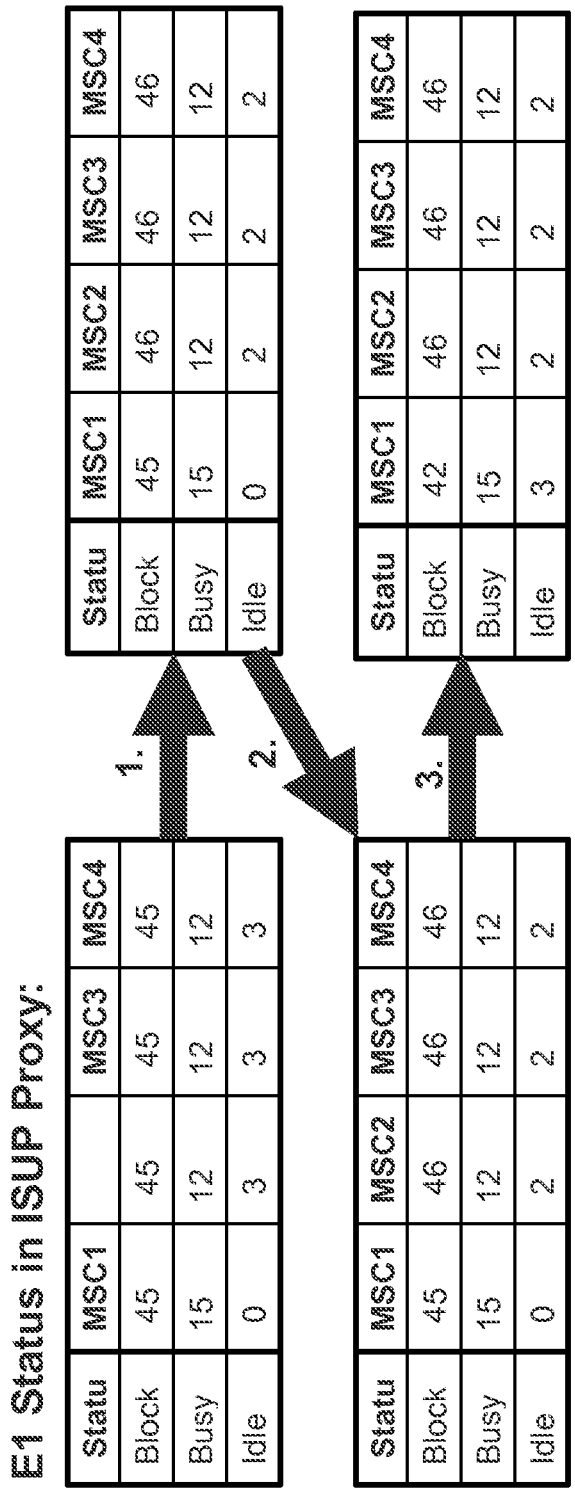
FIG. 16 illustrates an algorithm for use in re-balancing TDM resources according to an embodiment of the invention.

Referring to FIG. 14, when ISUP functionality is implemented in the MGW 5 and ownership of TDM resources is changed, E1s are re-distributed and so the congestion problems illustrated in FIG. 4 are reduced. A TDM re-balancing algorithm, illustrated in FIG. 16, is implemented in the Media Gateway. In the rebalancing algrorithm the MGW 5 balances the amount of TDM resources between MSCs in the pool to guarantee that TDM resource congestion does not occur until almost all TDM resources are busy. This algorithm is based on the ISUP proxy maintaining 3 three states for CICs; busy, idle and blocked. When re-balancing is performed, MGW 5 sends a SCR to MSCs 2-4, which leads to CGB or BLO in ISUP. When calls are released, the MGW 5 sends SCR to MSC1, the E1 resources are available. The MSC then sends a CGU or UBL to an adjacent MSC. The re-balancing algorithm can be based on any of aligning of number of idle circuits; aligning of the utilization rate of circuits; normalization to original configuration prior to MSC failure. Furthermore, E1s can be configured be either static, in which case they are never re-balanced, or dynamic, in which case they can be use a part of the re-balancing. In this way, E1s can be reserved for exclusive use by a MSC.

The invention allows TDM resources to be pooled, which reduces the need for over-provisioning of TDM resources. One Point Code is visible to external networks, and MSC servers can be added to a pool without any modification of external networks (providing that no further E1s are required). Gateway MSCs are not required, which optimizes the capacity of and reduces the number of network nodes required.

Figure 17:
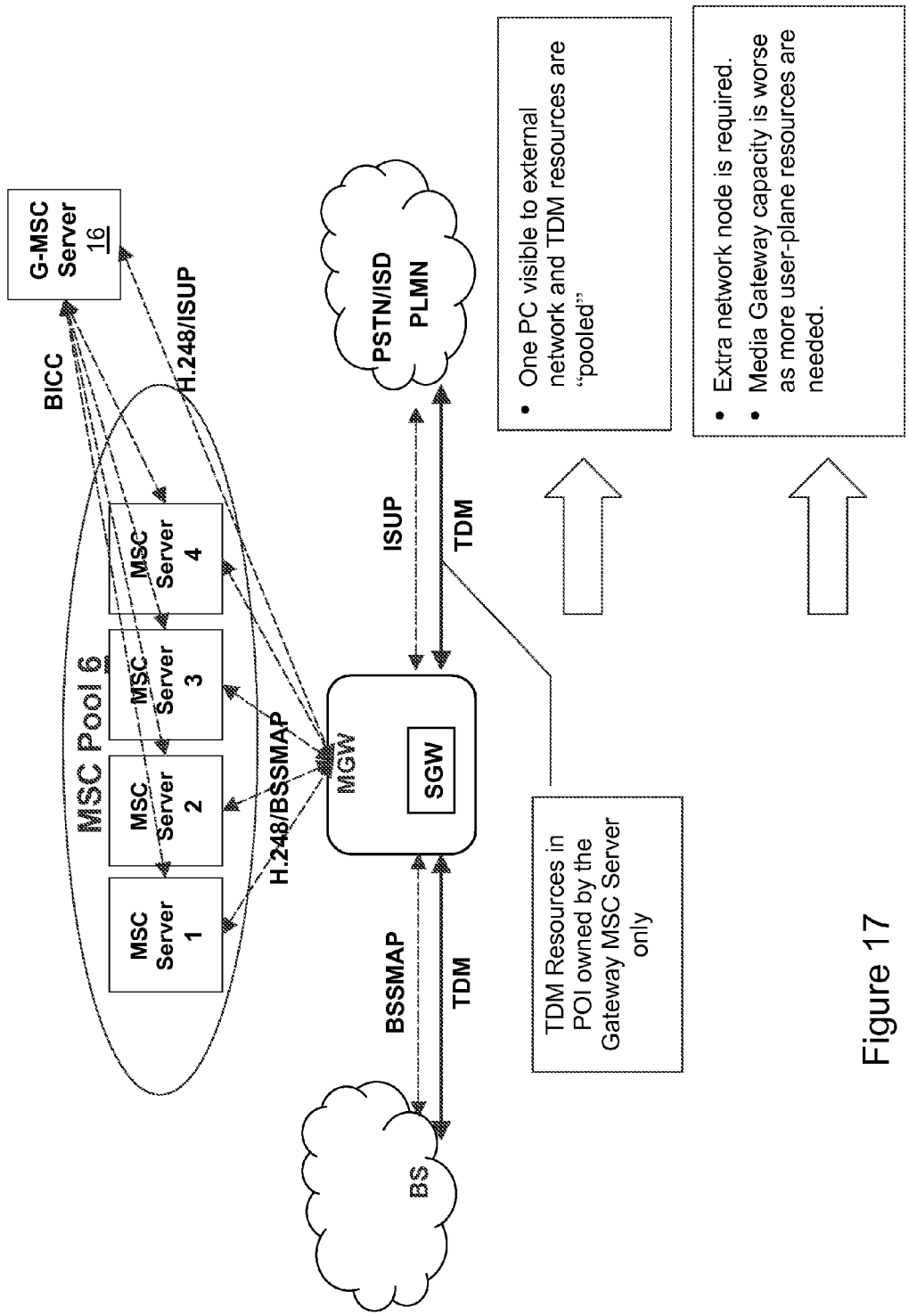
FIG. 17 illustrates schematically a network architecture according to a further embodiment of the invention.

According to a further embodiment of the invention, illustrated in FIG. 17, TDM resources at the POI are owned by a Gateway MSC Server 16 only. This requires an extra network node, but ensures that only one point code is visible to external networks, and the TDM resources can be pooled.

Figure 18:
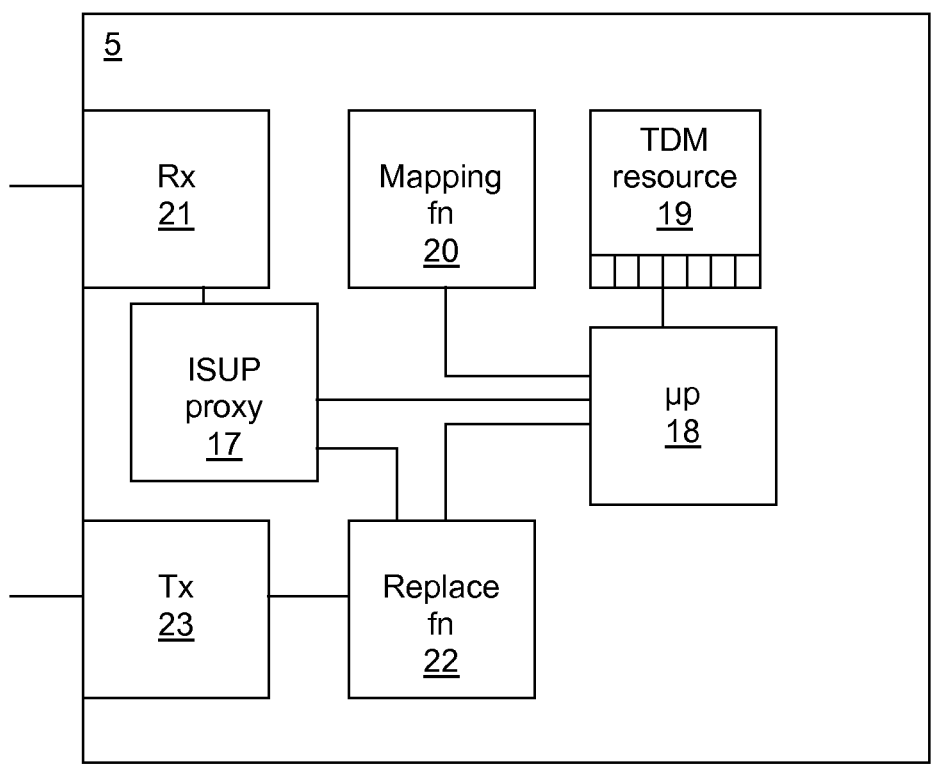
FIG. 18 illustrates schematically in a block diagram a MGW according to an embodiment of the invention.

Referring now to FIG. 18, the MGW 5 Media Gateway comprises an ISDN User Part signalling proxy function 17 and a processor 18 for allocating a TDM resource 19 to a MSC served by the MGW. The TDM resource is associated with an identifier of the MSC. There is also provided means 20 for mapping the TDM resource to the identifier, and a receiver 21 for receiving an ISDN User Part signalling message from the MSC. A function 22 for replacing the MSC-S identifier with an ISDN User Part signalling proxy function identifier is provided, and a transmitter 23 is also provided for sending the message to a node in an external network.

Although various embodiments have been shown and described in detail, the claims are not limited to any particular embodiment or example. None of the above description should be read as implying that any particular element, step, range, or function is essential such that it must be included in the claims' scope. The scope of patented subject matter is defined only by the claims. The extent of legal protection is defined by the words recited in the allowed claims and their equivalents.

The invention claimed is:

1. A method of managing Circuit Identifier Codes for a pool of Mobile Switching Centre Servers in a communications network, the method comprising:

at a Media Gateway function serving the pool of Mobile Switching Centre Servers, providing Circuit Identifier Codes;

receiving at the Media Gateway function an Initial Address Message from a node in an external network;

selecting a Mobile Switching Centre Server from the pool to handle a communication associated with the Initial Address Message;

dynamically allocating virtual Circuit Identifier Codes to the selected Mobile Switching Centre Server, mapping the virtual Circuit Identifier Codes to the Circuit Identifier Codes;

amending the Initial Address Message to include a flag identifying the allocated virtual Circuit Identifier Codes; and sending the amended Initial Address Message to the selected Mobile Switching Centre Server.

2. The method according to claim 1, further comprising:

receiving at the Media Gateway function an Initial Address Message from a Mobile Switching Centre Server in the pool of Mobile Switching Centre Servers, the Initial Address message including an identity of virtual Circuit Identifier Codes;

determining from the virtual Circuit Identifier Codes identified in the message the Circuit Identifier Codes allocated;

amending the Initial Address Message to include a flag identifying the allocated Circuit Identifier Codes; and sending the amended Initial Address Message to a node in an external network.

3. A Media Gateway for use in a communications network, the Media Gateway comprising:

means for providing Circuit Identifier Codes;

a receiver for receiving an Initial Address Message from a node in an external network;

means for selecting a Mobile Switching Centre Server from a pool of Mobile Switching Centre Servers to handle a communication associated with the Initial Address Message;

means for dynamically allocating virtual Circuit Identifier Codes to the selected Mobile Switching Centre Server from the pool;

means for mapping the virtual Circuit Identifier Codes to the Circuit Identifier Codes;

means for amending the Initial Address Message to include a flag identifying the allocated virtual Circuit Identifier Codes; and a transmitter for sending the amended Initial Address Message to the selected Mobile Switching Centre Server.

4. The Media Gateway according to claim 3, further comprising:

a receiver for receiving an Initial Address Message sent from a Mobile Switching Centre Server in the pool of Mobile Switching Centre Servers, the Initial Address message including an identity of virtual Circuit Identifier Codes;

means for determining from the virtual Circuit Identifier Codes identified in the message the Circuit Identifier Codes allocated;

means for amending the Initial Address Message to include a flag identifying the allocated Circuit Identifier Codes; and a transmitter for sending the amended Initial Address Message to a node in an external network.

5. A method of managing Circuit Identifier Codes for a pool of Mobile Switching Centre Servers in a communications network, the method comprising:

providing an ISDN User Part signalling proxy function located at a Media Gateway, the Media Gateway serving at least one Mobile Switching Centre Server of the pool of Mobile Switching Centre Servers;

allocating one of a plurality of Circuit Identifier Codes at the Media Gateway to the at least one of the Mobile Switching Centre Servers, the Circuit Identifier Code being associated with an identifier of the Mobile Switching Centre Server, and mapping the Circuit Identifier Code to the identifier of the Mobile Switching Centre Server;

receiving an ISDN User Part signalling message at the Media Gateway from the Mobile Switching Centre Server, the ISDN User Part signalling message including the identifier of the Mobile Switching Centre Server;

replacing the Mobile Switching Centre Server identifier in the ISDN User Part signalling message with an ISDN User Part signalling proxy function identifier;

sending the message to a node in an external network; and re-allocating the Circuit Identifier Code to another one of the Mobile Switching Centre Servers, wherein, a subsequent communication received from the node in the external network is not impacted by the re-allocation of the Circuit Identifier Code due to the replacement of the Mobile Switching Centre Server identifier with the ISDN User Part signalling proxy function identifier in the message.

6. The method according to claim 5, comprising:

receiving an ISDN User Part signalling message at the Media Gateway from the node in an external network, the message comprising a Circuit Identifier Code;

determining from the Circuit Identifier Code the identifier of a Mobile Switching Centre Server, and forwarding the message to the identified Mobile Switching Centre Server.

7. The method according to claim 5, further comprising:

allocating Circuit Identifier Codes to each Mobile Switching Centre Server in the Mobile Switching Centre Server pool; and re-allocating Circuit Identifier Codes in the event that a Mobile Switching Centre Server is no longer available.

8. The method according to claim 5, further comprising:

dynamically re-allocating Circuit Identifier Codes to each Mobile Switching Centre Server in the Mobile Switching Centre Server pool to minimize resource congestion for an individual Mobile Switching Centre.

9. The method according to claim 8, comprising:

reserving at least some Circuit Identifier Codes at the Media Gateway to a Mobile Switching Centre Server such that they cannot be dynamically allocated to another Mobile Switching Centre Server.

10. A Media Gateway for use in a communications network the Media Gateway comprising:

an ISDN User Part signalling proxy function;

means for allocating one of a plurality of Circuit Identifier Codes at the Media Gateway to one Mobile Switching Centre Server of a pool of Mobile Switching Centre Servers served by the Media Gateway, the Circuit Identifier Code being associated with an identifier of the at least one Mobile Switching Centre Server;

means for mapping the Circuit Identifier Code to the identifier of the Mobile Switching Centre Server;

a receiver for receiving an ISDN User Part signalling message at the Media Gateway from the Mobile Switching Centre Server, the ISDN User Part signalling message including the identifier of the Mobile Switching Centre Server;

means for replacing the Mobile Switching Centre Server identifier in the ISDN User Part signalling message with an ISDN User Part signalling proxy function identifier;

a transmitter for sending the message to a node in an external network; and means for dynamically re-allocating the Circuit Identifier Code to another one of the Mobile Switching Centre Servers, wherein, a subsequent communication received from the node in the external network is not impacted by the re-allocation of the Circuit Identifier Code due to the replacement of the Mobile Switching Centre Server identifier with the ISDN User Part signalling proxy function identifier in the message.

11. The Media Gateway according to claim 10, wherein the means for dynamically re-allocating the Circuit Identifier Code re-allocates the Circuit Identifier Code in the event that a Mobile Switching Centre Server is no longer available.

12. The Media Gateway according to claim 10, wherein the means for dynamically re-allocating the Circuit Identifier Code minimizes resource congestion for an individual Mobile Switching Centre.

* * * * *